US011945272B1

(12) United States Patent
Elie (10) Patent No.: US 11,945,272 B1
(45) Date of Patent: Apr. 2, 2024

(54) NATURAL ACTIVE VEHICLE SUSPENSION ASSEMBLY

(71) Applicant: FORD GLOBAL TECHNOLOGIES, LLC, Dearborn, MI (US)

(72) Inventor: Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 17/940,304

(22) Filed: Sep. 8, 2022

(51) Int. Cl.
*B60G 17/016* (2006.01)
*B60B 21/00* (2006.01)
*B60K 7/00* (2006.01)

(52) U.S. Cl.
CPC ............ *B60G 17/016* (2013.01); *B60B 21/00* (2013.01); *B60K 7/0007* (2013.01)

(58) Field of Classification Search
CPC .... B60G 17/016; B60G 3/01; B60G 14/0157; B60B 21/00; B60B 27/0052; B60K 7/0007

See application file for complete search history.

(56) References Cited

U.S. PATENT DOCUMENTS

| 11,091,022 B2 | 8/2021 | Rallings |
| 2018/0118298 A1 | 5/2018 | David et al. |

FOREIGN PATENT DOCUMENTS

WO 2017093746 A1 6/2017

*Primary Examiner* — Jason D Shanske
*Assistant Examiner* — Matthew James O'Neill
(74) *Attorney, Agent, or Firm* — Burr & Forman LLP (57) ABSTRACT

A vehicle suspension system may include a vehicle chassis, a centerless wheel which may include a wheel rim and a tire, and a natural active suspension assembly which may operably couple the centerless wheel to the vehicle chassis via the wheel rim. The natural active suspension assembly may support the vehicle chassis at a substantially constant distance away from a ground plane by generating reactive torque to counteract displacement of the centerless wheel normal to the ground plane by moving a support location between the natural active suspension assembly and the wheel rim.

20 Claims, 5 Drawing Sheets

NATURAL ACTIVE VEHICLE SUSPENSION ASSEMBLY

TECHNICAL FIELD

Example embodiments generally relate to vehicle suspension and, more particularly, relate to an active suspension system.

BACKGROUND

Vehicles commonly employ independent suspension that allows each wheel to move relative to the vehicle chassis independent of the other wheels. The components and geometries used for independent suspension designs can vary to some degree, but are generally well known and relatively unchanged at the core of their design throughout history. Thus, there exists a need for an updated vehicle suspension system that takes an alternative approach to vehicle suspension to achieve greater levels of performance of a vehicle.

BRIEF SUMMARY OF SOME EXAMPLES

In accordance with an example embodiment, a vehicle suspension system may therefore be provided. The vehicle suspension system may include a vehicle chassis, a centerless wheel which may include a wheel rim and a tire, and a natural active suspension assembly which may operably couple the centerless wheel to the vehicle chassis via the wheel rim. The natural active suspension assembly may support the vehicle chassis at a substantially constant distance away from a ground plane by generating reactive torque to counteract displacement of the centerless wheel normal to the ground plane by moving a support location between the natural active suspension assembly and the wheel rim.

In another example embodiment, a natural active suspension assembly for a vehicle may therefore be provided. The natural active suspension assembly may include a motor which may be disposed inside a centerless wheel, a suspension arm which may operably couple the motor to a vehicle chassis, and a wheel rim engagement assembly which may operably couple the motor to a wheel rim of the centerless wheel. The natural active suspension assembly may support the vehicle chassis at a substantially constant distance away from a ground plane by generating reactive torque to counteract displacement of the centerless wheel normal to the ground plane by moving a support location between the natural active suspension assembly and the wheel rim.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
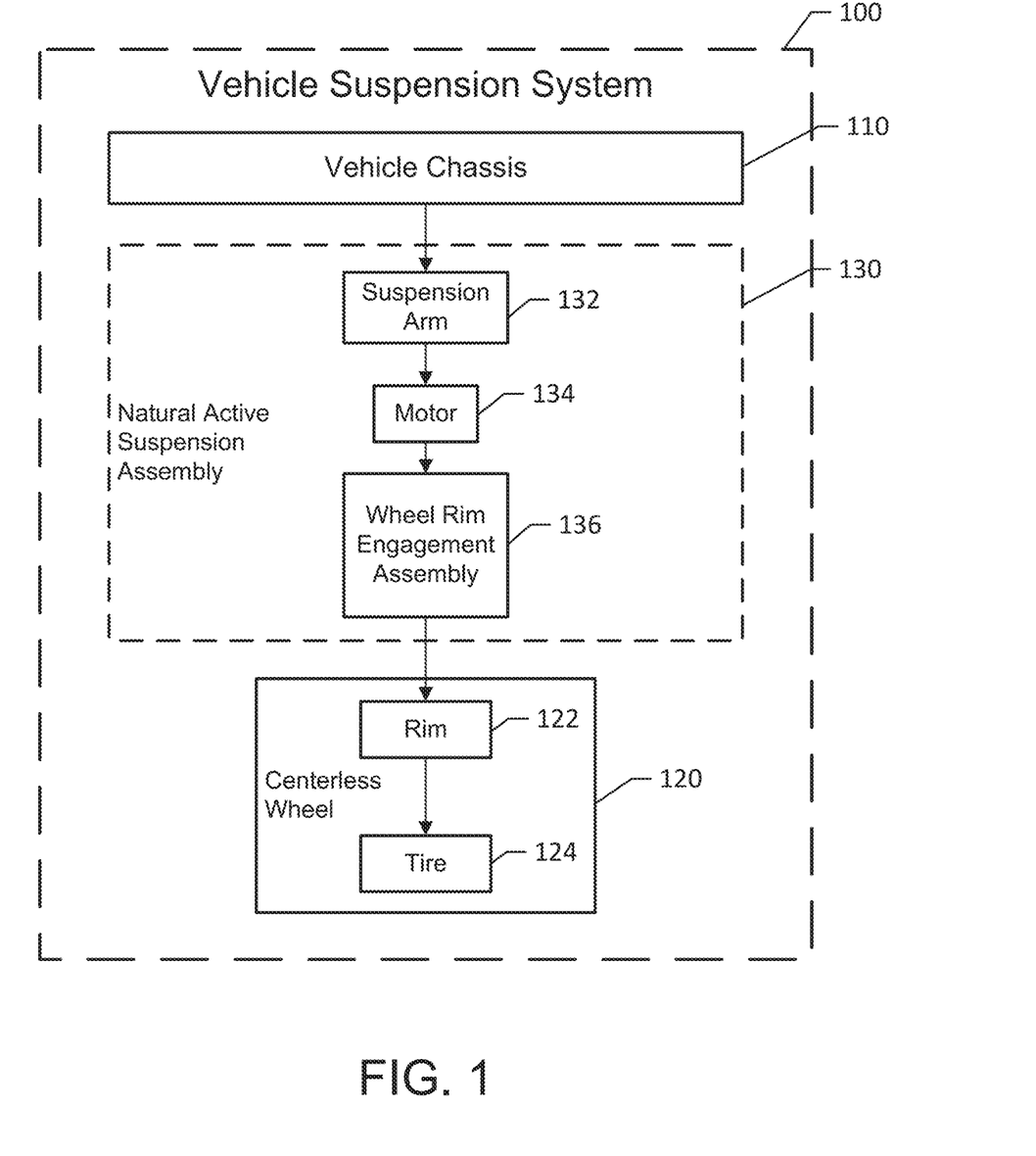
FIG. 1 illustrates a block diagram of a vehicle suspension system in accordance with an example embodiment.

FIG. 1 illustrates a block diagram of a vehicle suspension system 100 in accordance with an example embodiment. The vehicle suspension system 100 may be operably coupled to a vehicle body, and may be configured to keep the vehicle body stable while driving by allowing wheels of the vehicle to articulate independently of the vehicle body when driving on uneven driving surfaces. The vehicle suspension system 100 may be employed on a vehicle having any suitable type of propulsion, including battery electric vehicles (BEVs), vehicles powered by internal combustion engines (ICEs), and various hybrid technologies as well. The vehicle suspension system 100 may include a vehicle chassis 110, a centerless wheel 120, and a natural active suspension assembly 130. In some embodiments, the vehicle chassis 110 may be the frame or platform to which the body of the vehicle is operably coupled. In some other cases, the vehicle chassis 110 may be integrated into the vehicle body. In an example embodiment, the centerless wheel 120 may include a wheel rim 122 and a tire 124. The centerless wheel 120 may also include an axis of rotation 126 (see FIG. 2A) disposed at a center of the centerless wheel 120, but the centerless wheel 120 may not have a physical structure (e.g., an axle to which a typical suspension assembly may operably couple) disposed at the axis of rotation 126. In other words, the centerless wheel 120 may rotate about the axis of rotation 126, but the axis of rotation 126 may not operably couple to the vehicle chassis 110 via any physical connection disposed at the axis of rotation 126. Thus, the axis of rotation 126 may be an imaginary axis through the center of the centerless wheel 120 about which the centerless wheel 120 rotates.

In an example embodiment, the natural active suspension assembly 130 may operably couple the centerless wheel 120 to the vehicle chassis 110 at the wheel rim 122. In this regard, the natural active suspension assembly 130 may include a suspension arm 132, a motor 134, and a wheel rim engagement assembly 136. The suspension arm 132 may operably couple to the vehicle chassis 110 at a first end of the suspension arm 132 and to a shaft of the motor 134 at a second end of the suspension arm 132. Thus, when the vehicle is in motion, the centerless wheel 120 may rotate about the axis of rotation 126, while the motor 134 and the wheel rim engagement assembly 136 may be disposed inside the centerless wheel 120 and variably operably coupled to the wheel rim 122 at a variable location along the wheel rim 122. The location at which the operable coupling occurs may change based on the dynamic forces imparted on the system 100 by encountering objects or depressions that move the centerless wheel 120 upward or downward. The variability of the location at which the wheel rim engagement assembly 136 may operably couple to the wheel rim 122 may be controlled in such a way as to generally maintain the vehicle chassis 130 at substantially the same distance from the surface or road on which the vehicle operates (e.g., a ground plane 140 of FIG. 2A). The motor 134 may be disposed on an inside side of the wheel rim 122, away from the tire 124, which may be disposed on an outside side of the wheel rim 122. Accordingly, the variable operable coupling of the wheel rim engagement assembly 136 to the wheel rim 122 may allow the wheel rim 122 to rotate about the axis of rotation 126 independently of both the motor 134 and the wheel rim engagement assembly 136. In some embodiments, the wheel rim engagement assembly 136 may include bearings which may reduce a coefficient of friction between the wheel rim 122 and the wheel rim engagement assembly 136 and thus allow the wheel rim 122 to rotate freely relative to the wheel rim engagement assembly 136, except in response to suspension-related reaction forces introduced by displacement of the centerless wheel 120 relative to the ground plane 140.

Figure 2A:
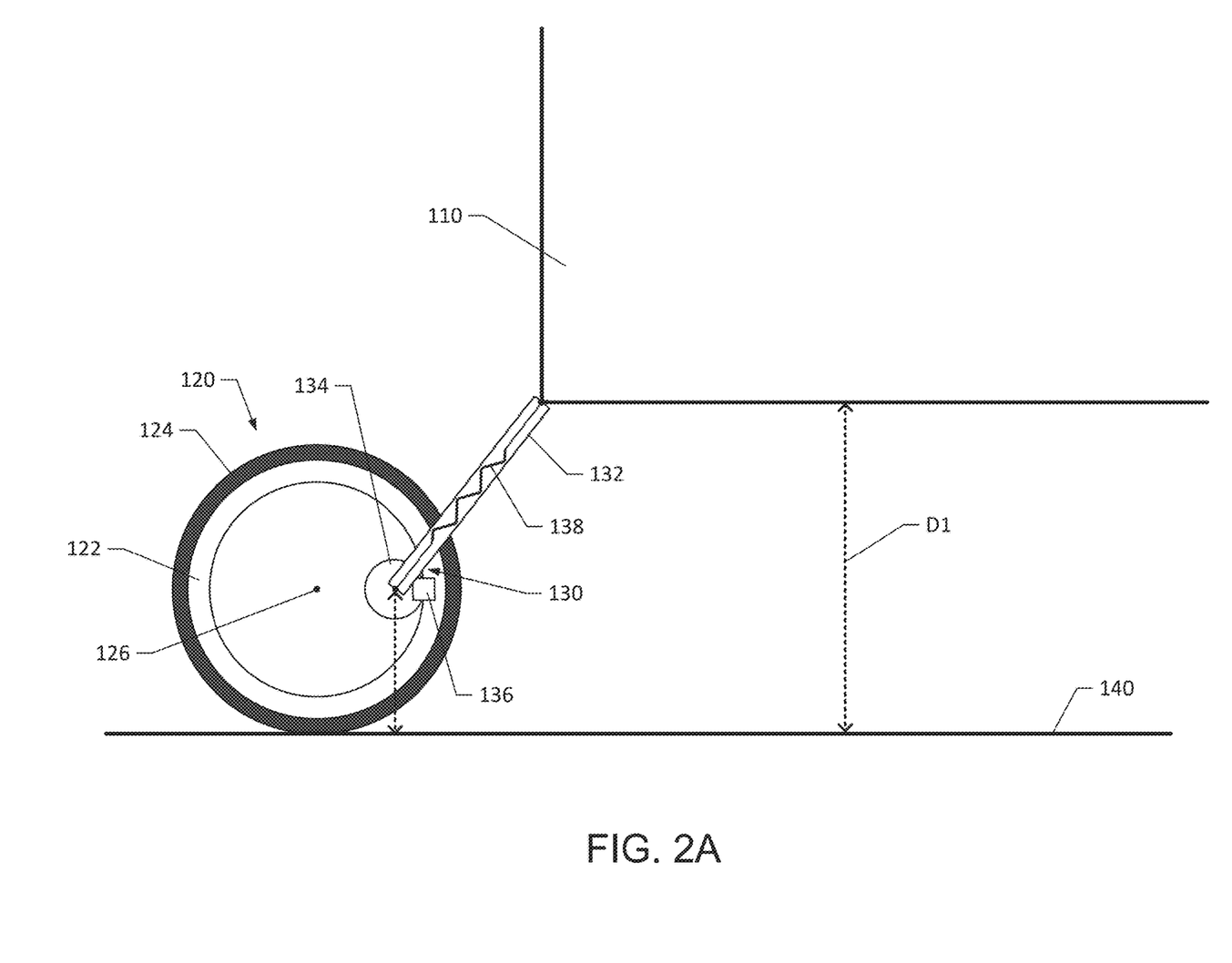
FIG. 2A illustrates a side view of the vehicle suspension system in a nominal support location in accordance with an example embodiment.
Figure 2B:
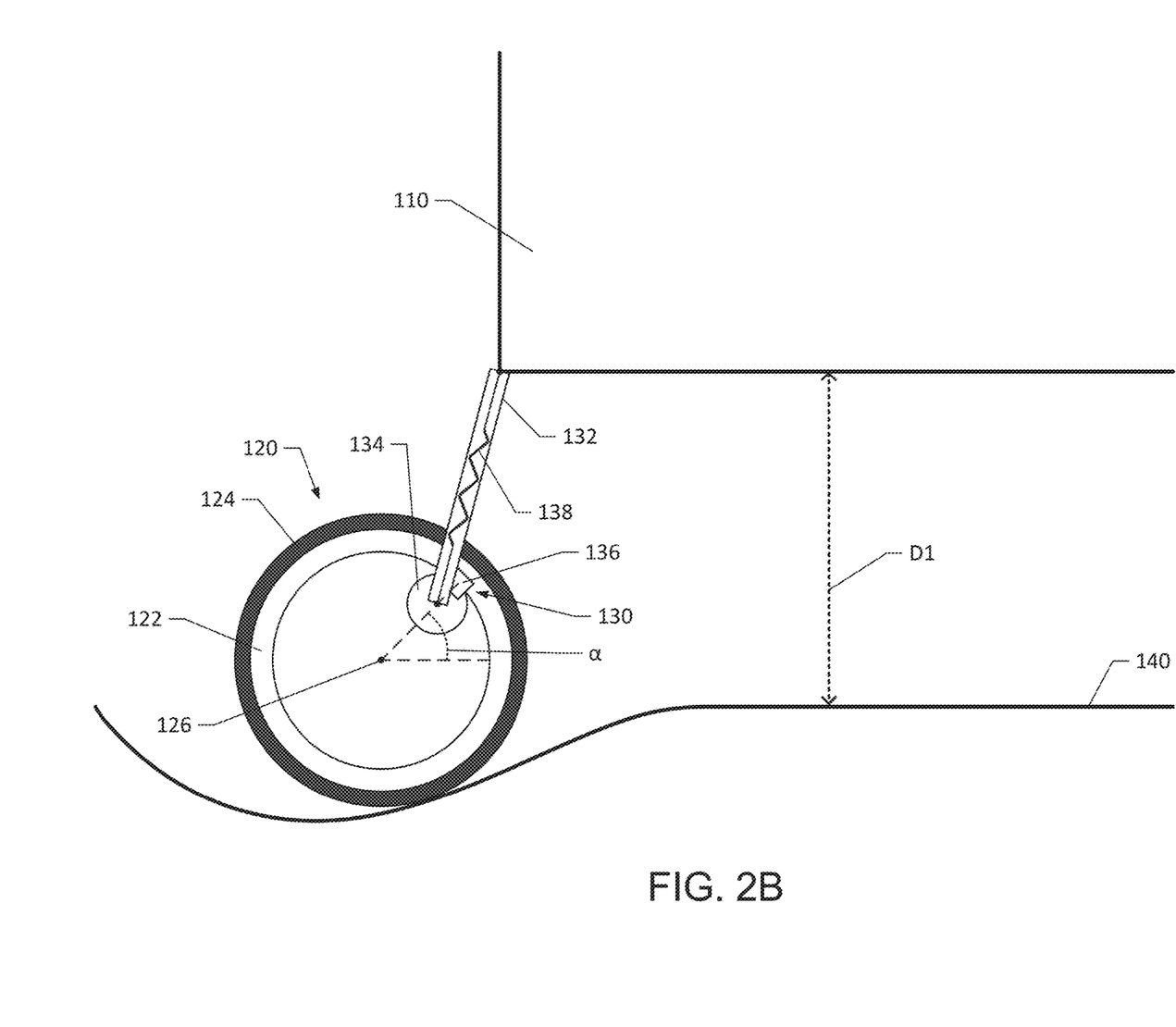
FIG. 2B illustrates a side view of the vehicle suspension system in a relative maximum position in accordance with an example embodiment.
Figure 2C:
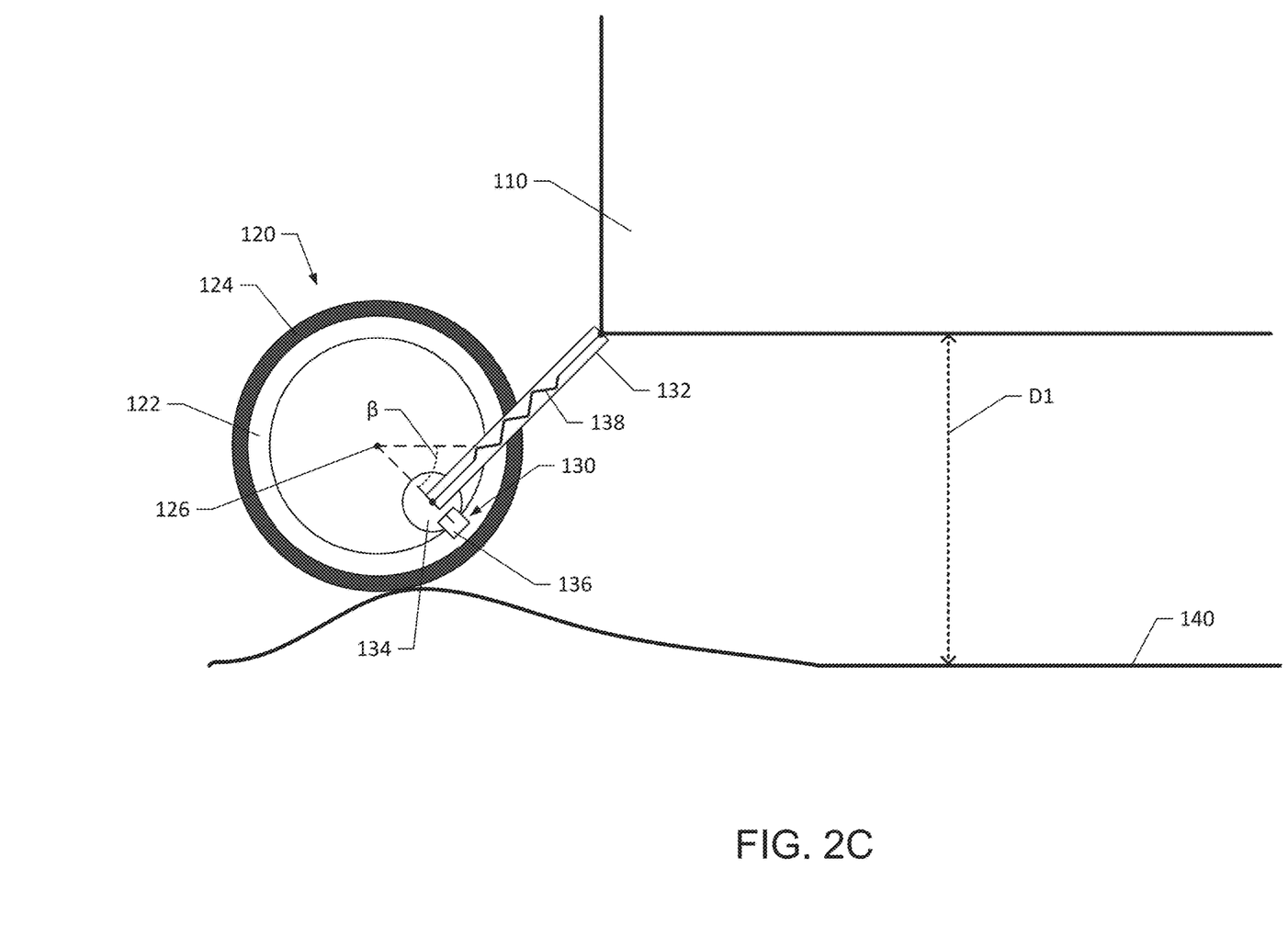
FIG. 2C illustrates a side view of the vehicle suspension system in a relative minimum position in accordance with an example embodiment.

FIGS. 2A, 2B, and 2C each illustrate a respective side view of the vehicle suspension system 100 in accordance with an example embodiment. FIGS. 2A, 2B, and 2C depict a range of motion of the natural active suspension assembly 130, which may be defined by the operable coupling of the suspension arm 132 to the wheel rim 122 via the motor 134 and the wheel rim engagement assembly 136. In this regard, FIG. 2A depicts the natural active suspension assembly 130 in a nominal support location. In the nominal support location, the motor 134 may be level with the axis of rotation 126 while still being disposed at the wheel rim 122. In other words, both the axis of rotation 126 and the motor 134 (or an axis thereof) may be located about the same distance above the ground plane 140. Thus, the angle formed between the motor 134 and the axis of rotation may be about zero degrees. In some embodiments, the goal of the natural active suspension assembly 130 may be to maintain the motor 134 at the nominal support location except in response to reaction forces initiated by the centerless wheel 120 encountering discontinuities in the ground plane 140. In this regard, the motor 134 and the wheel rim engagement assembly 136 may be displaced from the nominal support location responsive to the centerless wheel 120 driving over a bump or through a hole that thereby generates reaction forces in the motor 134 that cause the variable location at which the wheel rim engagement assembly 136 engages the wheel rim 120 to change.

Responsive to either driving over a bump or through a hole, the motor 134 may generate reactive torque to return the natural active suspension assembly 130 to the nominal support location. In other words, the nominal support location may be a point of equilibrium for the vehicle suspension system 100. In an example embodiment, the nominal support location may be disposed a distance equal to about one radius of the centerless wheel 120 above a point of contact between the centerless wheel 120 and the ground plane 140. In some cases, the natural active suspension assembly 130 may occupy the nominal support location while the vehicle may be driving over a smooth flat surface where vertical displacement of the centerless wheel 120 may not occur. In some embodiments, the natural active suspension assembly 130 may further comprise one or more instances of a biasing member 138 that may be configured to bias the suspension arm 132 to assist the motor 134 in maintaining the natural active suspension assembly 130 in the nominal support location. In an example embodiment, the biasing member 138 may be a spring, such as a leaf spring, coil spring, helical spring, or any of various other suitable types of springs.

When the vehicle is driving on a smooth flat surface (i.e. the centerless wheel 120 has negligible vertical displacement), the shaft of the motor 134 may essentially "lock" the orientation of the suspension arm 132, effectively holding the natural active suspension assembly 130 in the nominal support location. In other words, the suspension arm 132 may operably couple to the vehicle chassis 110 at the first end of the suspension arm 132, and to the shaft of the motor 134 at the second end of the suspension arm 132. In this regard, the suspension arm 132 may be modeled as a cantilevered beam. For example, the vehicle chassis 110 has mass and thus, due to the force of gravity, may provide a downward force focused at the first end of the suspension arm 132. For the purposes of this example, the second end of the suspension arm 132 may be considered to be "fixed" in that the shaft of the motor 134 may resist rotational displacement. The suspension arm 132 may thus translate the weight of the vehicle chassis 110 into a moment about the second (fixed) end of the suspension arm 132 which is operably coupled to the shaft of the motor 134. Thus, the vehicle chassis 110, via the suspension arm 132, may apply a torque on the shaft of the motor 134. In this case, in order to remain in the nominal support location, the motor 134 must generate a reactive torque to counteract any rotational displacement of the shaft of the motor 134 due to the suspension arm 132 changing its orientation relative to the motor 134 due to the moment discussed above. Accordingly, the natural active suspension assembly 130 may support the vehicle chassis 110 at a substantially constant distance D1 above the ground plane 140 while the vehicle drives.

As shown in FIGS. 2B and 2C, the natural active suspension assembly 130 may continue to support the vehicle chassis 110 at the substantially constant distance D1 away from the ground plane 140 despite displacement of the centerless wheel 120 normal to the ground plane 140. To accomplish this, the motor 134 may generate varying magnitudes of reactive torque. In other words, in the above example where the vehicle was driving at a constant velocity on the smooth flat surface, the motor 134 may match the torque from the moment of the suspension arm 132 on the shaft to maintain the nominal support location of the natural active suspension assembly 130 and thus maintain the ride height of the vehicle chassis 110 at the distance D1.

For example, assume the vehicle, and thus the centerless wheel 120, may be driving through a hole such as the one depicted in FIG. 2B. In order to counteract the vertical displacement of the centerless wheel 120 normal to the ground plane 140 and maintain the ride height of the vehicle chassis 110 at distance D1, the motor 134 must generate reactive torque responsive to the centerless wheel 120 being displaced. Thus, the geometry of the natural active suspension assembly 130 may change to counteract the varying position of the centerless wheel 120 via reactive torque generated by the motor 134.

In this regard, the natural active suspension assembly 130 may counteract the vertical displacement of the centerless wheel 120 depicted in FIG. 2B by moving the support location of the natural active suspension assembly 130 up relative to the wheel rim 122 by adjusting the reactive torque of the motor 134 to account for the torque force generated by the moment of the suspension arm 132 accordingly. Thus, the natural active suspension assembly 130 may have a relative maximum position. In some embodiments, the relative maximum position may be about 45 degrees counter-clockwise from the nominal support location, as shown by angle α in FIG. 2B. In other words, in some cases, the motor 134 and the other components of the natural active suspension assembly 130 may not exceed a 45 degrees counter-clockwise rotation from the nominal support location. However, the design of the vehicle suspension system 100 could be such that larger angles are possible in some cases, or that the maximum angle is less than 45 degrees in other cases.

In another example, assume the vehicle, and thus the centerless wheel 120, may be driving over a bump such as the one depicted in FIG. 2C. In order to counteract the vertical displacement of the centerless wheel 120 normal to the ground plane 140 and maintain the ride height of the vehicle chassis 110 at the distance D1, the motor 134 must generate reactive torque responsive to the centerless wheel 120 being displaced. Thus, the geometry of the natural active suspension assembly 130 may change to counteract the varying position of the centerless wheel 120 via reactive torque generated by the motor 134. In this regard, the natural active suspension assembly 130 may counteract the vertical displacement of the centerless wheel 120 depicted in FIG. 2C by moving the support location of the natural active suspension assembly 130 down relative to the wheel rim 122 by adjusting the reactive torque of the motor 134 to account for the torque force generated by the moment of the suspension arm 132 accordingly. Thus, the natural active suspension assembly 130 may have a relative minimum position. In some embodiments, the relative minimum position may be about 45 degrees clockwise from the nominal support location as shown by angle R in FIG. 2C. In other words, the motor 134 and the other components of the natural active suspension assembly 130 may not exceed a 45 degrees clockwise rotation from the nominal support location. However, as noted above, the design of the vehicle suspension system 100 could be such that larger angles are possible in some cases, or that the maximum angle is less than 45 degrees in other cases.

In an example embodiment, the motor 134 may satisfy both a drive load for the vehicle and a lift load for the vehicle. In some cases, the motor 134 may be operably coupled to a gear set to obtain different gear ratios to reduce the torque required to lift the mass of the vehicle at varying drive speeds. In some embodiments, a planetary gear set may balance a combined load on the motor 134 comprising the lift load and the drive load. In an example embodiment, a separate gearbox may be responsible for driving the centerless wheel 120 and the motor 134 may only be responsible for controlling the lift load of the vehicle chassis 110. In some embodiments, the motor 134 may be an electric motor and may include two armatures. The two armature motor 134 may be advantageous to modify control to lift the load of the vehicle chassis 110 independent of powering the drive of the vehicle. In this regard, independent control of the lift load and the drive load of the vehicle may be advantageous for maintaining the lift load at a manageable level while the vehicle is driving. In other words, without the ability to control the lift load and the drive load independently, the lift load may be a function of the drive load and any increase in velocity of the vehicle may change the force required to lift the vehicle which may therefore affect the height of the vehicle chassis 110.

Figure 3:
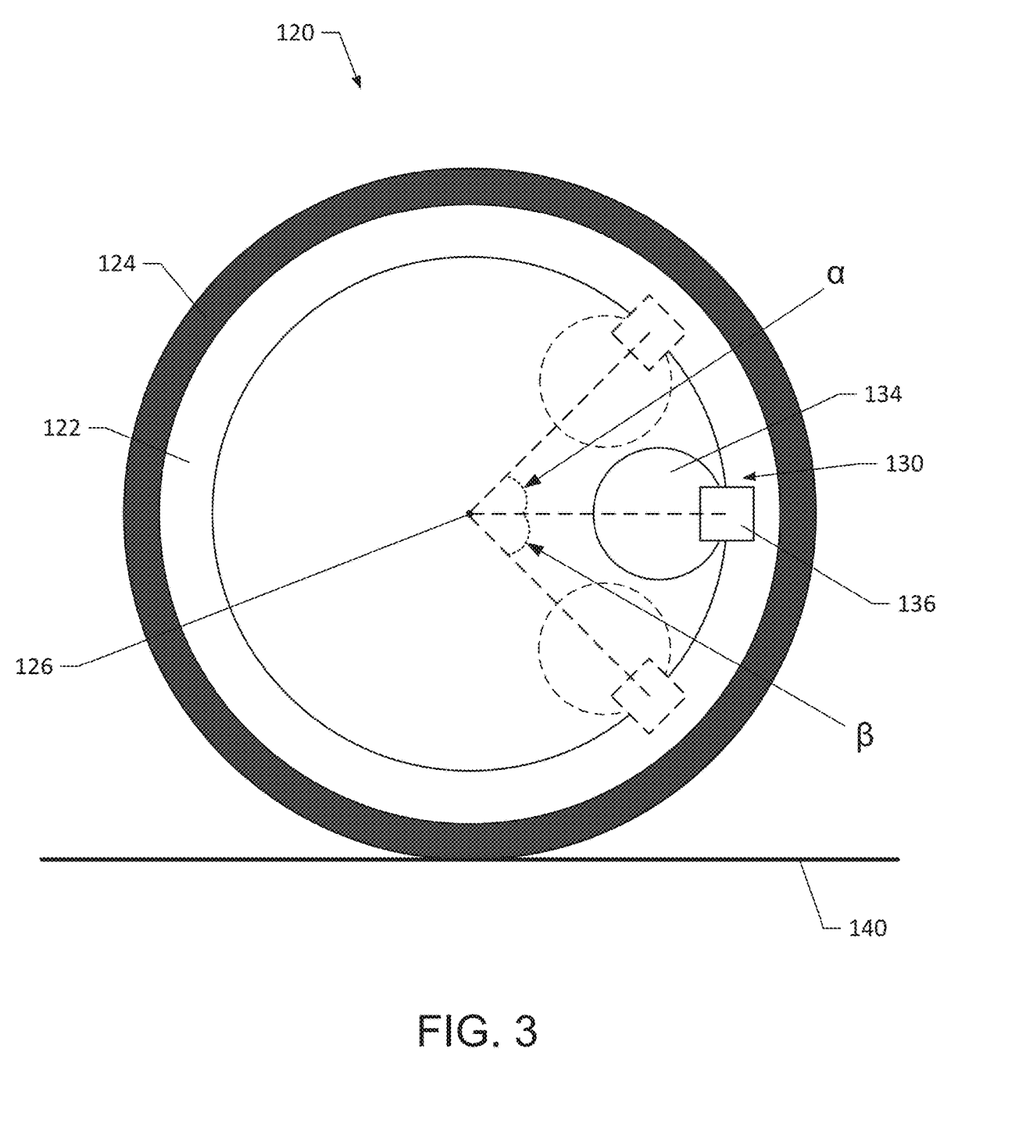
FIG. 3 illustrates a side view of a centerless wheel and motor in accordance with an example embodiment.

FIG. 3 illustrates a side view of the centerless wheel 120 and natural active suspension assembly 130 components in accordance with an example embodiment. As shown in FIG. 3, the natural active suspension assembly 130 may define a range of motion between the relative maximum position above the nominal support location and the relative minimum position below the nominal support location. In some embodiments, the range of motion of the natural active suspension assembly 130 may be a function of the force required by the motor 134 to generate sufficient torque to lift the vehicle chassis 110. In this regard, the available lift of the motor may be reduced by the cosine of the angle formed between the motor 134 and the axis of rotation 126. Thus, the range of motion may be limited in this regard to a maximum of angle α (45 degrees counterclockwise from the nominal support location) and a minimum of angle β (45 degrees clockwise from the nominal support location).

For example, assume the vehicle has a gross mass of 2000 kilograms and a total of four wheels 120. In this case, each wheel may support about 500 kilograms of mass from the vehicle. Also assume the vehicle drives at 100 km/hr, or approximately 1.67 km/min, on a smooth and level ground plane 140, and that each wheel receives an average of 6.25 kW of power from a powertrain of the vehicle. For a "normal" tire 124 size of P265/70R17, which has a circumference of about 2.35 meters, the following equation determines the wheel speed in revolutions per minute for a vehicle speed of 100 km/hr.

$$\frac{1.67 \text{ km/min}}{2.35 \text{ m}} * \frac{1000 \text{ m}}{1 \text{ km}} \cong 709 \text{ } rpm$$

So the wheel 120 with a tire 124 size of P265/70R17 rotates about 709 times per minute while the vehicle travels on a smooth surface at 100 km/hr. Using the power and the wheel speed, the following equation may be used to determine the torque at each wheel 120.

$$\text{Torque} = \text{constant} * \frac{\text{power}}{\text{speed}}$$

$$\tau = 9.5488 * \frac{6.25 \text{ kW}}{709 \text{ } rpm}$$

$$\tau = 84.17 \text{ } NM$$

Thus the torque at each wheel 120 on smooth and level ground and no wind at a constant 100 km/hr is about 84.17 NM (newton meters), which yields a thrust of approximately 7.3 N at the tire 124 tread of each wheel 120. In other words, the powertrain of the vehicle may need to supply 7.3 N of thrust to each wheel 120 to get the vehicle to 100 km/hr. However, it is important to note that at 100 km/hr, air resistance (wind drag) may be the most dominate term in determining the thrust. Air resistance also increases as a square of the speed, and as such, the total thrust load is a non-linear function. Therefore, at only 50 km/hr, the thrust may be substantially less than half of the above calculations for 100 km/hr.

If the wheel rim 122 is 17" (approximately 432 mm) and the shaft of the motor 134 may be operably coupled to the wheel rim via a 50 mm "gear", the gear ratio of the wheel rim 122 to the motor 134 is 8.64:1.

$$\frac{432 \text{ mm}}{50 \text{ mm}} = 8.64$$

Assume the requirements of the motor 134 are 9.74 NM at 6125 rpm. The reactive torque of the motor 134 (−9.74 NM) will be acting across the tire 124 sidewall height, which for a P265/70R17 tire 124 may be approximately 158 mm, plus the 25 mm radius from the gear operably coupled to the motor 134, for a total of 182 mm.

$$\frac{9.74 NM}{0.182 \text{ m}} = 53.4 N$$

Thus, the above yields 53.4 N of reaction force (or lift). This is 7.3 times the thrust on the road, but less than one ninth of the force needed to raise 500 kg per wheel significantly if applied normal to the ground plane 140. Furthermore, typical wheel, tire and brake structures are often around 40 kg total mass, and a centerless wheel 120 has even less mass. Thus the calculated 53.4 N of force may be sufficient to raise or lower the tire 124 with respect to a center of mass of the vehicle.

Now, assume the tire 124 is an ultra-low profile tire 124. A 385/15R22 tire may have a sidewall height of just 58 mm, a circumference of 2.12 m, and a wheel rim 122 diameter of 558.8 mm.

$$\frac{1.67 \text{ km/min}}{2.12 \text{ m}} * \frac{1000 \text{ m}}{1 \text{ km}} \cong 788 \text{ rpm}$$

$$\tau = 9.5488 * \frac{6.25 \text{ kW}}{788 \text{ rpm}}$$

$$\tau = 75.7 NM$$

Thus the torque at each wheel 120 on smooth and level ground and no wind at a constant 100 km/hr is about 75.7 NM.

Using the same 50 mm gear operably coupled to the motor 134, and the new rim diameter of 558.8 mm, the gear ratio of the wheel rim 122 to the motor 134 is 11.2:1.

$$\frac{558.8 \text{ mm}}{50 \text{ mm}} \cong 11.2$$

The requirements of the motor 134 are now 6.75 NM at 8825 rpm. The reactive torque of the motor 134 (−9.74 NM) will be acting across the tire 124 sidewall height (58 mm), plus the 25 mm radius from the gear operably coupled to the motor 134, for a total of 83 mm.

$$\frac{6.75 NM}{0.083 \text{ m}} = 81.3 N$$

Thus, the above yields 81.3 N of reaction force (or lift). This is 11.1 times the thrust on the road, but about than one sixth of the force needed to raise 500 kg per wheel significantly if applied normal to the ground plane 140. In other words, the motor 134 would fully support a vehicle with a mass of only 350 kg at 100 km/hr.

Thus, the vehicle suspension system 100 may need a gear set configured to select different gear ratios particularly to function better at varying vehicle speeds and varying vehicle loads. As shown in the above examples, gear ratios in excess of 11:1 and 6:1 will fully lift the mass of the vehicle at 100 km/hr. A higher gear ratio may be needed for additional vehicle loads and for lower vehicle speeds.

A vehicle suspension system may therefore be provided. The vehicle suspension system may include a vehicle chassis, a centerless wheel which may include a wheel rim and a tire, and a natural active suspension assembly which may operably couple the centerless wheel to the vehicle chassis via the wheel rim. The natural active suspension assembly may support the vehicle chassis at a substantially constant distance away from a ground plane by generating reactive torque to counteract displacement of the centerless wheel normal to the ground plane by moving a support location between the natural active suspension assembly and the wheel rim.

The vehicle suspension system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the natural active suspension assembly may be operably coupled to the centerless wheel to define a range of motion between the natural active suspension assembly and the wheel rim from a relative maximum position above a nominal support location to a relative minimum position below the nominal support location. In an example embodiment, the natural active suspension assembly may generate reactive torque to move the natural active suspension assembly towards the relative maximum position responsive to the centerless wheel being displaced downward relative to the ground plane. In some cases, the natural active suspension assembly may generate reactive torque to move the natural active suspension assembly towards the relative minimum position responsive to the centerless wheel being displaced upward relative to the ground plane. In an example embodiment, the nominal support location may be disposed at a point on the wheel rim that may be a distance substantially equal to a radius of the centerless wheel above the ground plane. In some cases, the relative maximum position may be disposed about 45 degrees counterclockwise from the nominal support location on the centerless wheel. In an example embodiment, the relative minimum position may be disposed about 45 degrees clockwise from the nominal support location on the centerless wheel. In some cases, the natural active suspension assembly may include a motor which may be disposed inside the centerless wheel, a suspension arm which may operably couple the motor to the vehicle chassis, and a wheel rim engagement assembly which may operably couple the motor to the wheel rim. In an example embodiment, the suspension arm may include a spring which may bias the motor of the natural active suspension assembly towards the nominal support location on the wheel rim. In some cases, the wheel rim engagement assembly may include bearings to slidably operably couple the motor to the wheel rim.

A natural active suspension assembly for a vehicle may therefore be provided. The natural active suspension assembly may include a motor which may be disposed inside a centerless wheel, a suspension arm which may operably couple the motor to a vehicle chassis, and a wheel rim engagement assembly which may operably couple the motor to a wheel rim of the centerless wheel. The natural active suspension assembly may support the vehicle chassis at a substantially constant distance away from a ground plane by generating reactive torque to counteract displacement of the centerless wheel normal to the ground plane by moving a support location between the natural active suspension assembly and the wheel rim.

The natural active suspension assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the natural active suspension assembly may be operably coupled to the centerless wheel to define a range of motion between the natural active suspension assembly and the wheel rim from a relative maximum position above a nominal support location to a relative minimum position below the nominal support location. In an example embodiment, the natural active suspension assembly may generate reactive torque to move the natural active suspension assembly towards the relative maximum position responsive to the centerless wheel being displaced downward relative to the ground plane. In some cases, the natural active suspension assembly may generate reactive torque to move the natural active suspension assembly towards the relative minimum position responsive to the centerless wheel being displaced upward relative to the ground plane. In an example embodiment, the nominal support location may be disposed at a point on the wheel rim that may be a distance substantially equal to a radius of the centerless wheel above the ground plane. In some cases, the relative maximum position may be disposed about 45 degrees counterclockwise from the nominal support location on the centerless wheel. In an example embodiment, the relative minimum position may be disposed about 45 degrees clockwise from the nominal support location on the centerless wheel. In some cases, the wheel rim engagement assembly may include bearings to slidably operably couple the motor to the wheel rim. In an example embodiment, the suspension arm may include a spring which may bias the motor of the natural active suspension assembly towards the nominal support location on the wheel rim. In some cases, the motor may have two armatures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension system comprising:
a vehicle chassis;
a centerless wheel comprising a wheel rim and a tire; and
a natural active suspension assembly operably coupling the centerless wheel to the vehicle chassis via the wheel rim,
wherein the natural active suspension assembly supports the vehicle chassis at a substantially constant distance away from a ground plane by generating reactive torque to counteract displacement of the centerless wheel normal to the ground plane by moving a support location between the natural active suspension assembly and the wheel rim.

2. The vehicle suspension system of claim 1, wherein the natural active suspension assembly is operably coupled to the centerless wheel to define a range of motion between the natural active suspension assembly and the wheel rim from a relative maximum position above a nominal support location to a relative minimum position below the nominal support location.

3. The vehicle suspension system of claim 2, wherein the natural active suspension assembly generates reactive torque to move the natural active suspension assembly towards the relative maximum position responsive to the centerless wheel being displaced downward relative to the ground plane.

4. The vehicle suspension system of claim 2, wherein the natural active suspension assembly generates reactive torque to move the natural active suspension assembly towards the relative minimum position responsive to the centerless wheel being displaced upward relative to the ground plane.

5. The vehicle suspension system of claim 2, wherein the nominal support location is disposed at a point on the wheel rim that is a distance substantially equal to a radius of the centerless wheel above the ground plane.

6. The vehicle suspension system of claim 2, wherein the relative maximum position is disposed about 45 degrees counterclockwise from the nominal support location on the centerless wheel.

7. The vehicle suspension system of claim 2, wherein the relative minimum position is disposed about 45 degrees clockwise from the nominal support location on the centerless wheel.

8. The vehicle suspension system of claim 2, wherein the natural active suspension assembly comprises:
a motor disposed inside the centerless wheel;
a suspension arm operably coupling the motor to the vehicle chassis; and
a wheel rim engagement assembly operably coupling the motor to the wheel rim.

9. The vehicle suspension system of claim 8, wherein the suspension arm comprises a spring to bias the motor of the natural active suspension assembly towards the nominal support location on the wheel rim.

10. The vehicle suspension system of claim 8, wherein the wheel rim engagement assembly comprises bearings to variably operably couple the motor to the wheel rim.

11. A natural active suspension assembly for a vehicle, the natural active suspension assembly comprising:
a motor disposed inside a centerless wheel;
a suspension arm operably coupling the motor to a vehicle chassis; and
a wheel rim engagement assembly operably coupling the motor to a wheel rim of the centerless wheel,
wherein the natural active suspension assembly supports the vehicle chassis at a substantially constant distance away from a ground plane by generating reactive torque to counteract displacement of the centerless wheel normal to the ground plane by moving a support location between the natural active suspension assembly and the wheel rim.

12. The natural active suspension assembly of claim 11, wherein the natural active suspension assembly is operably coupled to the centerless wheel to define a range of motion between the natural active suspension assembly and the wheel rim from a relative maximum position above a nominal support location to a relative minimum position below the nominal support location.

13. The natural active suspension assembly of claim 12, wherein the natural active suspension assembly generates reactive torque to move the natural active suspension assembly towards the relative maximum position responsive to the centerless wheel being displaced downward relative to the ground plane.

14. The natural active suspension assembly of claim 12, wherein the natural active suspension assembly generates reactive torque to move the natural active suspension assembly towards the relative minimum position responsive to the centerless wheel being displaced upward relative to the ground plane.

15. The natural active suspension assembly of claim 12, wherein the nominal support location is disposed at a point on the wheel rim that is a distance substantially equal to a radius of the centerless wheel above the ground plane.

16. The natural active suspension assembly of claim 12, wherein the relative maximum position is disposed about 45 degrees counterclockwise from the nominal support location on the centerless wheel.

17. The natural active suspension assembly of claim 12, wherein the relative minimum position is disposed about 45 degrees clockwise from the nominal support location on the centerless wheel.

18. The natural active suspension system of claim 12, wherein the suspension arm comprises a spring to bias the motor of the natural active suspension assembly towards the nominal support location on the wheel rim.

19. The natural active suspension assembly of claim 11, wherein the wheel rim engagement assembly comprises bearings to variably operably couple the motor to the wheel rim.

20. The natural active suspension assembly of claim 11, wherein the motor has two armatures.

* * * * *